US 12,473,836 B2

(12) United States Patent
Schlimpert et al.

(10) Patent No.: US 12,473,836 B2
(45) Date of Patent: Nov. 18, 2025

(54) GENERATOR, GEAR BOX, TURBOMACHINE, AND FLOW CONTROL DEVICE

(71) Applicants: Flanders Make VZW, Lommel (BE); Universiteit Gent, Ghent (BE)

(72) Inventors: Stephan Schlimpert, Sint-Truiden (BE); Bart Peremans, Diest (BE); Bram Robberechts, Leuven (BE); Jasper Nonneman, Berchem (BE)

(73) Assignees: Flanders Make VZW, Lommel (BE); Universiteit Gent, Ghent (BE)

( * ) Notice: Subject to any disclaimer, the term of this patent is extended or adjusted under 35 U.S.C. 154(b) by 0 days.

(21) Appl. No.: 18/701,876

(22) PCT Filed: Oct. 21, 2022

(86) PCT No.: PCT/EP2022/079410
§ 371 (c)(1),
(2) Date: Apr. 16, 2024

(87) PCT Pub. No.: WO2023/067155
PCT Pub. Date: Apr. 27, 2023

(65) Prior Publication Data
US 2024/0410288 A1 Dec. 12, 2024

(30) Foreign Application Priority Data
Oct. 22, 2021 (NL) ........................ 2029488

(51) Int. Cl.
*F01D 25/18* (2006.01)
*F01D 11/04* (2006.01)
*F16J 15/40* (2006.01)

(52) U.S. Cl.
CPC .............. *F01D 11/04* (2013.01); *F01D 25/18* (2013.01); *F16J 15/40* (2013.01);
(Continued)

(58) Field of Classification Search
CPC . F01D 11/04; F01D 25/18; F01D 9/06; F01D 9/065; F01D 11/10; F16J 15/40
See application file for complete search history.

(56) References Cited

U.S. PATENT DOCUMENTS 3,575,528 A * 4/1971 Beam, Jr. .................. F01D 5/08
415/12
7,344,139 B2 * 3/2008 Gaebler ................ F01D 25/183
277/432
(Continued)

FOREIGN PATENT DOCUMENTS

DE 3533829 A1 4/1987
DE 102014224282 A1 6/2016
(Continued)

OTHER PUBLICATIONS

Netherlands Search Report and Written Opinion dated Sep. 14, 2022, for Netherlands Application No. 2029488.
(Continued)

*Primary Examiner* — Nathaniel E Wiehe
*Assistant Examiner* — Theodore C Ribadeneyra
(74) *Attorney, Agent, or Firm* — Patterson + Sheridan, LLP

(57) ABSTRACT

There is provided a rotation device comprising a rotor, a stator, a target component, and a sealing device. The rotor is arranged to rotate along a rotation axis relative to the stator. The stator is arranged radial outward of the rotor to form a gap between the rotor and the stator. The sealing device is attached to the rotor to hydrodynamically seal the g against a fluid. The sealing device is adapted to direct the fluid to the target component to exchange heat between the target component and the fluid, and/or to lubricate the target component with the fluid.

35 Claims, 8 Drawing Sheets

Figure 1:
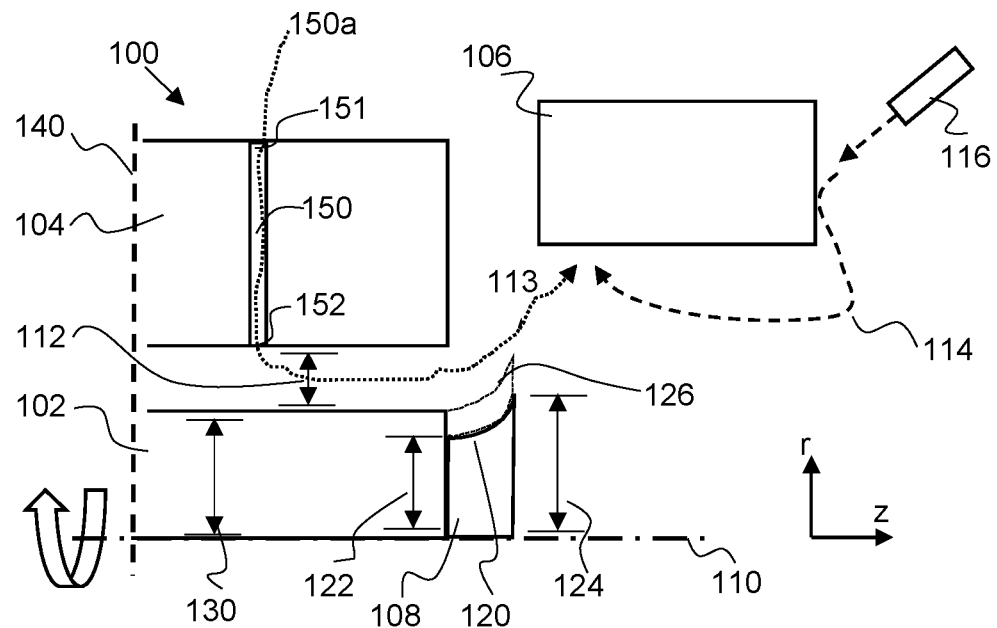

(52) U.S. Cl.
CPC ...... *F05D 2220/30* (2013.01); *F05D 2240/55* (2013.01); *F05D 2260/98* (2013.01)

(56) References Cited

U.S. PATENT DOCUMENTS

| | | | | |
|---|---|---|---|---|
| 8,038,399 | B1* | 10/2011 | Liang | .................... F04D 29/083 |
| | | | | 415/230 |
| 2003/0168815 | A1* | 9/2003 | Rensch | .................... F16J 15/42 |
| | | | | 277/409 |
| 2013/0170983 | A1* | 7/2013 | Babu | ....................... F01D 11/04 |
| | | | | 416/97 R |
| 2017/0089467 | A1 | 3/2017 | Young | |

FOREIGN PATENT DOCUMENTS

| | | |
|---|---|---|
| EP | 0972910 A1 | 1/2000 |
| EP | 3372793 A2 | 9/2018 |
| EP | 3712469 A1 | 9/2020 |
| GB | 2409247 A | 6/2005 |

OTHER PUBLICATIONS

PCT International Search Report and Written Opinion dated Feb. 27, 2023, for International Application No. PCT/EP2022/079410.
PCT International Preliminary Report on Patentability dated Oct. 26, 2023, for International Application No. PCT/EP2022/079410.

\* cited by examiner

FIG. 8A
FIG. 8B
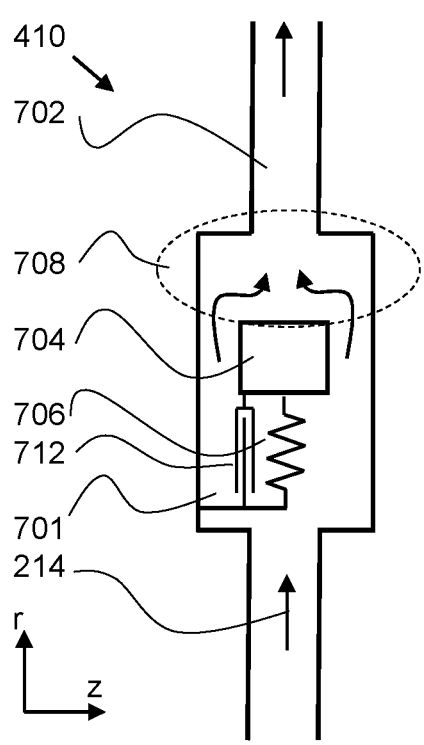
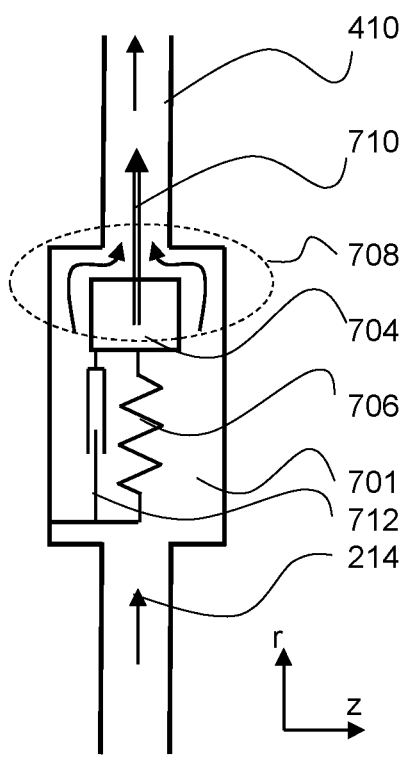
FIG. 9A
FIG. 9B
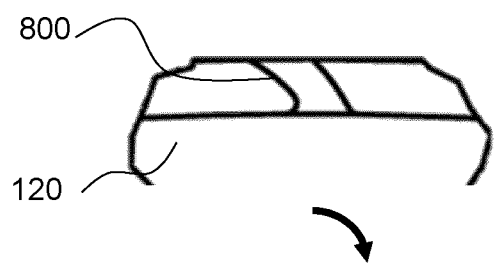
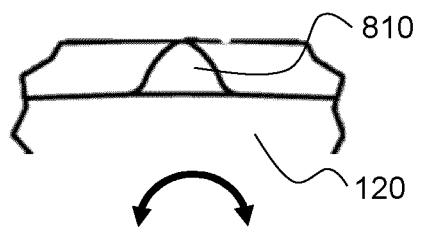

GENERATOR, GEAR BOX, TURBOMACHINE, AND FLOW CONTROL DEVICE

The invention relates to a rotation device comprising a stator and a rotor. The invention further relates to an electric motor or an electric generator having such a rotation device. The invention further relates to a gear box or a turbomachine comprising such a rotation device. Further, the invention relates to a flow control device for use in the rotation device.

Acknowledgement: This research was supported by Flanders Make, the strategic research center for the manufacturing industry, and the HERMESFONDS in the framework of the SingleOilCnL project (HBC.2020.2009).

In various applications, rotation devices are applied. A rotation device has a stator and a rotor that is rotatable along a rotation axis relative to the stator. The rotor is rotatably coupled to the stator via a bearing arrangement. Typically, a gap is present between the stator and the rotor to prevent contact between the rotor and the stator other than via the bearing arrangement. By providing the gap, the rotor is able to rotate relative to the stator with a minimum amount of friction. The gap is typically sealed to prevent the gap from contaminating. The seal aims to prevent contamination such as particles or liquid entering the gap. If a particle or even a drop of liquid enters the gap and creates a contact that contacts both the rotor and the stator, a large friction force may be created when the rotor rotates relative to the stator. A drop of liquid may cause the large friction force because due to the high density and viscosity of the liquid compared to a gas in the gap. The friction force becomes especially large for high speed rotation of the rotor.

A known type of seal is a hydrodynamic seal. A hydrodynamic seal is arranged on the rotor. As the rotor rotates, the rotor generates a centrifugal force. The hydrodynamic seal uses the centrifugal force to create a fluid flow that blocks or limits contamination from entering the gap. A contaminant near the gap is pushed away from the gap by the fluid flow created by the hydrodynamic seal.

A hydrodynamic seal is known from the sealing device used in the turbomachine disclosed in PCT-application number WO2015/181326A1. The sealing device separates a first compartment with a wet gas from a second compartment in the turbomachine. The wet gas has contaminants that should not reach the second compartment. The sealing device has a rotary component and a stationary component. The rotary component has an oil-jet element. The stationary component has a wet-particles collector arranged radially outward of the oil-jet element. An electric motor drives the rotor. When the rotor rotates, a centrifugal force causes the oil-jet element to project wet particles into the collector to prevent the wet gas from reaching the second compartment. The wet particles are then removed from the collector.

A disadvantage of the known turbomachine is that the electric motor requires a cooling system to maintain the temperature of the electric motor below a maximum acceptable temperature. The cooling system needs to have a large cooling capacity to ensure sufficient cooling of the electric motor. Another disadvantage of the known turbomachine is that a lubrication system is needed to lubricate the bearings that support the rotor. Without sufficient lubrication, the bearings would wear excessively. The lubrication system needs to have a large quantity of lubrication to ensure that the bearings are sufficiently lubricated.

It is an objective of the invention to provide a rotation device that has an improved heat transfer and/or has an improved lubrication or at least to provide an alternative rotation device.

The objective of the invention is achieved by a rotation device comprising a rotor, a stator, a target component, and a sealing device. The rotor is arranged to rotate along a rotation axis relative to the stator. The stator and the rotor are arranged relative to each other to form a gap between the rotor and the stator. The sealing device is attached to the rotor to hydrodynamically seal the gap against a fluid. The sealing device is adapted to direct the fluid to the target component to exchange heat between the target component and the fluid, and/or to lubricate the target component with the fluid.

By transferring heat to the fluid, the target component is cooled, or the target component is allowed to generate more heat while maintaining a certain temperature. Because of the heat exchange with the fluid, the target component is able to generate more heat without exceeding a maximum temperature. In an example, the target component has a main function that is different from generating heat. Because the target component is allowed to generate more heat, the target component is able to perform the main function in an improved way. For example, the target component is able to perform the main function faster, for a longer period of time, with less interruption, with a higher efficiency and/or with less wear. As a result, the performance of the rotation device is improved. In case the rotation device comprises a cooling system, the cooling system may have a smaller cooling capacity compared to the cooling system used in the known turbomachine. The cooling system with the smaller cooling capacity is sufficient to properly cool the rotation device.

By lubricating the target component with the fluid via the sealing device, a separated lubrication system may be omitted. By omitting the lubrication system, a more compact rotation device may be obtained. In another example, the sealing device improves, the lubrication of the target component by providing the fluid via one side of the target component, whereas the lubrication system provides the fluid via another side of the target component. In another example, both the lubrication system and the sealing device provide the fluid to the same side of the target component. Because both the lubrication system and the sealing device provide the fluid, the lubrication is improved. For example, it is sufficient to provide a lubrication system that supplies a smaller quantity of lubrication compared to the lubrication system in the known turbomachine. The improved lubrication may lead to an extended lifetime of the target component, or may allow the target component to be operated at an increased load. Operating at an increased load includes, for example, operating at a higher speed, operating while being loaded with a larger mass, or operating with less interruptions.

The sealing device is adapted to direct the fluid to the target component to exchange heat with the target component, to lubricate the target component, or to exchange heat with the target component and to lubricate the target component simultaneously.

Although heat transfer and lubrication are different physical phenomena, both may occur if an object comes into contact with a fluid. The invention makes use of the sealing device to direct the fluid to the target component to bring the fluid into contact with the target component. Because of this single inventive concept, the performance of the rotation device is improved compared to the known turbomachine.

The performance is improved either relating to heat transfer, to lubrication or both heat transfer and lubrication.

A rotation device is a device that has a rotor and a stator. The rotor is able to rotate along a rotation axis relative to the stator. The rotation device is, for example, a motor to drive another device. The rotation device is, for example, a positioning device for positioning a workpiece supported by the rotation device. The rotation device is, for example, adapted to rotate a tool to perform an operation of the tool on a workpiece. Examples of such a tool are a drill or a saw or a grindstone. The rotation device is, for example, adapted to be coupled to a fan or an impeller or a rotating part of a turbine to manipulate a flow of gas or a flow of liquid. The rotation device has, for example, a motor to drive the rotor relative to the stator. The motor is, for example, integrated in the rotation device. Alternatively, the motor is an external motor that is coupled to the rotation device. In an example, the rotor is adapted to not only rotate relative to the stator, but also to translate relative to the stator along the rotational axis.

The rotor has, for example, a length and a diameter that is smaller than the length. The rotor has, for example, a length and a diameter that is larger than the length. The rotor comprises, for example, a part with a circular cross-section perpendicular to the rotation axis, and a part with a non-circular cross-section perpendicular to the rotation axis. The part with the non-circular cross-section has, for example, a rotational symmetric cross-section. The rotor is a solid rotor or a hollow rotor.

The stator has, for example, a circular or rotational symmetric cross-section perpendicular to the rotation axis. The stator has, for example, a non-rotational symmetric cross-section perpendicular to the rotation axis, such as square or rectangular. The stator is, for example, provided with a mounting device for mounting the rotation device in a system assembly. The system assembly is, for example, a gear box or a turbine or an electric motor or an electric generator. For example, the stator is arranged radially outward of the stator to form the gap as a radial gap. For example, the stator and the rotor are arranged facing each other in an axial direction to form the gap as an axial gap.

The target component is any component of the rotation device that desires heat transfer and/or lubrication. In case of heat transfer, the temperature of the target component should be different from the temperature of the fluid to allow for heat to be transferred. The target component desires heat transfer if the target component is, for example, a component that has a main function other than generating heat. The component generates heat, for example, due to a limited efficiency of performing the main function. Due to the limited efficiency, the target component heats up while performing the main function. By transferring heat from the target component to the fluid, the target component is able to keep performing the main function without reaching an unacceptable high temperature. In an example, the target component is arranged to transfer heat with the fluid via an intermediate body. For example, the target component is attached to a housing of the rotation device. The intermediate body is the housing. The sealing device directs the fluid to a target surface of the housing. The target component and the fluid exchange heat via the target surface of the housing. The target surface of the housing has a good heat transfer properties. For example, the target surface is made of a material with a good thermal conductance, such as aluminum. For example, thickness of the target surface is smaller than the thickness of the rest of the housing to reduce the thermal resistance of the target surface. In an example, the target component is adapted to increase a target surface with the fluid. For example, the target surface of the target component is provided with fins and/or ribs to increase the surface area of the target surface compared to a surface with fins and/or ribs. In an example, the target surface comprises the complete outer surface of the target component. In another example, the target surface comprises a part of the outer surface of the target component.

When it is described in an embodiment or an example that heat is transferred from the target component to the fluid, an alternative is that heat is transferred from the fluid to the target component.

In case of lubrication, the target component is a component that is moveable relative to another object and that is in contact with that other object. For example, the target component is a gear. The gear is fixed to the rotor. The gear interacts with another gear to transfer a rotation of the rotor via the gear to the other gear. During rotation of the rotor, the teeth of the gears come into contact with each other. By directing the fluid to the target component to lubricate the target component, there is less friction between the teeth of the gears. This allows for a smooth operation of the gears, with less wear of the teeth and less noise. In another example, the target component is a rolling element bearing. A rolling element bearing has an outer ring, an inner ring, and multiple rolling elements arranged between the outer ring and the inner ring. The rolling elements allow the outer ring and the inner ring to rotate relative to each other. The outer ring is for example attached to the stator. The inner ring is for example attached to the rotor. The rolling element bearing rotatably supports the rotor relative to the stator. By providing the fluid to the target component, the fluid is able to provide additional lubrication for the rolling elements. The additional lubrication reduces the friction between the rolling elements and the outer ring and inner ring respectively. The additional lubrication, in an example, also washes out contamination in the rolling element bearing. Such contamination could increase the friction of the rolling element bearing.

During operational use of the rotation device, the gear or the rolling element bearing may increase in temperature due to friction, despite the additional lubrication. A small amount of friction may still occur. As a result of the increase in temperature, some heat may be transferred to the fluid. So in that case, the fluid provides both heat transfer as well as lubrication.

A sealing device is a device to prevents the fluid from entering the gap or limits the amount of fluid entering the gap. The sealing device is adapted to hydrodynamically seal the gap against the fluid. When the rotor rotates, the sealing device rotates as well, because the sealing device is attached to the rotor. The rotation of the rotor creates a centrifugal force. The sealing device uses the centrifugal force to generate a flow that guides the fluid away from the gap. Any fluid that flows in the direction of the gap, needs to pass through the flow generated by the sealing device before reaching the gap. By generating sufficient flow, the sealing device is able to redirect the fluid away from the gap. The sealing device generates the flow for example by pumping air near the sealing device in a radial direction. The sealing device generates the flow for example by accelerating a part of the fluid in a radial direction. That part to the fluid then redirects a further part of the fluid away from the gap. In an example, the sealing device comprises multiple hydrodynamic seals.

The sealing device has, for example, a further seal. For example, the further seal is a contacting seal, such as an O-ring. The contacting seal fills a part of the gap between the rotor and the stator. By filling the part of the gap, the further seal prevents or limits contamination from entering the remaining part of the gap. The contacting seal is attached to one of the rotor and the stator, and allows rotation of the other of the rotor and the stator. The contacting seal allows the rotation, for example, by sliding over the rotor or stator.

The fluid comprises a gas or a liquid or both a gas and a liquid. The fluid comprises, for example, a two-phase fluid, such as a two-phase refrigerant. For example, the sealing device is adapted to seal the gap against the liquid in the two-phase refrigerant, whereas the sealing device allows the gas in the two-phase refrigerant to enter the gap. The fluid comprises, for example, a suspension. The suspension has a liquid that carries solid particles. For example, the suspension is an oil with metal particles. The fluid comprises, for example, a mixture of a gas and solid particles. For example, the mixture is ambient air with organic particles. The fluid is, for example, a mixture of multiple liquids. The fluid is, for example, supplied to the rotation device to perform a function in the rotation device. In another example, the fluid enters the rotation device during operational use of the rotation device.

The gap has, for example, substantially the same height along the length of the gap. For example, some parts of the gap have a larger height than other parts. The gap is, for example, adapted to provide a suitable gap for a hydrostatic air bearing. The hydrostatic air bearing is arranged to rotatably support the rotor relative to the stator. The gap is, for example, adapted to provide a suitable gap for allowing a magnetic flux between the stator and the rotor. The gap is, for example, sufficiently large to prevent contact between the rotor and the stator via the gap due to manufacturing tolerances and deformations during operational use of the rotational device. The gap is, for example, at least 0.1 mm or at least 0.2 mm. The gap is, for example, in the range of 1.0-5.0 mm, for example 2.0-3.0 mm.

The sealing device seals the gap against the fluid. However, the gap may be filled with another fluid, such as air. Preferably, the other fluid in the gap has a lower density and/or a lower viscosity than the fluid.

In an embodiment, the target component is arranged outside the gap. For example, the target component is a separate part of the rotor and/or the stator. Additionally or alternatively, the target component is attached to the stator.

In an embodiment, the target component is configured to generate heat during operation of the rotation device. By exchanging heat between the target component and the fluid, the target component is cooled. Additionally or alternatively, the target component can be lubricated with the fluid. The target component for example comprises one or more parts with sliding and rolling contacts, wherein the one or more parts are moving during operation of the rotation device. The one or more parts require lubrication to function properly.

In an embodiment, the sealing device is at least partially arranged axial outward of the rotor. By having the sealing device at least partially arranged axial outward of the rotor, it is prevented that the fluid enters the gap between the rotor and the stator. The surfaces of the rotor and the stator extending over the gap can be kept clean against the fluid.

In an embodiment, the rotation device is adapted to guide a flow from the sealing device to the target component, wherein the sealing device is adapted to direct the fluid and/or a further fluid to the target component. The further fluid is for example a clean gas, such as clean air or clean nitrogen. A clean gas has no or very little particles. The clean gas is for example a dry gas with no or very little water vapor. The further fluid comprises, for example, ambient air. The further fluid for example comprises a gap fluid and/or a surrounding fluid and/or a stator fluid. The gap fluid is configured to flow through the gap. The surrounding fluid is for example ambient air. The stator fluid is configured to flow through the stator.

In an embodiment, the gap comprises a gap inlet and a gap outlet, wherein the gap outlet is arranged axial outward relative to the rotor and the stator, wherein the gap is adapted to guide the further fluid comprising the gap fluid from the gap inlet to the gap outlet. The gap fluid or further fluid can be configured to direct the fluid to the target component due to the interaction of the gap fluid with the sealing device. The gap fluid is for example air present in the gap. Instead of air, the gap fluid, or further fluid, can also be another fluid in a vapor or gas phase. The sealing device, which is e.g. arranged at or near the gas outlet, may e.g. be configured to receive the gap fluid and direct the gap fluid exiting the gas outlet towards the fluid, in order to deflect the fluid to the target component. Due to rotation of the rotor, the gap fluid, e.g., air, is pushed out of the gap outlet, because of the centrifugal force. As a result of the gap outlet being directed outwardly in axial direction, the gap fluid exiting the gap outlet is directed to the target component by the sealing device. The rotation device uses the gap fluid or future fluid to direct the fluid away from the gap and towards the target component.

In an embodiment, the flow from the sealing device to the target component is a mixture of the surrounding fluid (e.g. air) and the fluid (e.g. oil), wherein the sealing device is adapted to direct the flow to the target component. Alternatively, the flow from the sealing device to the target component is a mixture of the surrounding fluid, the gap fluid and the fluid. Centrifugal forces of the sealing device result in the flow. The surrounding fluid may originate from other locations outside the rotor and stator. The surrounding fluid is for example an air flow flowing between the stator and the target component. The flow enforced by the centrifugal forces leads to a higher pressure zone and a lower pressure zone near the sealing device. When the rotor is rotating, the flow is being directly targeted to the target component by the sealing device, e.g. for either cooling or lubrication of the target component.

In an alternative embodiment, the flow from the sealing device to the target component comprises the surrounding fluid, wherein the sealing device is adapted to direct the fluid to the target component using the flow. Centrifugal forces of the sealing device result in the flow. The flow comprises the surrounding fluid (e.g. air). Optionally, the flow comprises the gap fluid. The surrounding fluid may originate from other locations outside the rotor and stator. The surrounding fluid is for example an air flow flowing between the stator and the target component. The flow enforced by the centrifugal forces leads to a higher pressure zone and a lower pressure zone near the sealing device. When the rotor is rotating, the flow is being targeted to the fluid in order to deflect the fluid to the target component, e.g. for either cooling or lubrication of the target component. This situation for example occurs when the amount of injected fluid and/or the injection pressure of fluid is kept relatively low such that fluid will not form a mixture with the surrounding fluid.

In an embodiment, the stator comprises a stator channel having a stator inlet and at least one stator outlet, wherein the at least one stator outlet is arranged radially inward of the stator inlet, wherein the stator channel is arranged to guide the further fluid comprising the stator fluid from the stator inlet to the at least one stator outlet, wherein the stator outlet is arranged to provide the stator fluid to the gap. By doing so, the stator fluid entering the gap can enable a sealing of the gap against the fluid entering the gap. The stator fluid is for example air present in the stator channel. Instead of air, the stator fluid can also be another fluid in a vapor or gas phase. By providing the stator fluid via the stator channel to the gap, the stator fluid helps to prevent the fluid from entering the gap.

Optionally, an external fluid supply is provided. The external fluid supply is configured to provide an additional fluid, e.g. air, to the stator channel. The external fluid supply further helps to prevent the fluid from entering the gap.

In an embodiment, the fluid is a liquid.

According to the invention, the sealing device is adapted to seal the gap against a liquid. A liquid has a much higher viscosity and higher density than a gas. Also, especially in case of a narrow gap, a small volume of liquid in the gap would be spread along a relatively large surface of the rotor. If even a small volume of liquid would enter the gap, the high viscosity, the high density and the relatively large surface would significantly increase the friction between the rotor and the stator when rotating the rotor. The increase in friction would cause the rotation device to require more power to operate. In a worst case, the rotation device needs to be cleaned to remove the liquid from the gap. However, liquids typically have a much higher thermal conductivity and heat capacity than gasses. Therefore, liquids are typically better suited to transfer heat. Also, liquids typically provide for much better lubrication than gasses. Because the sealing device is adapted to direct the liquid away from the gap to the target component, a large friction force is prevented, while the heat transfer and/or the lubrication of the target component is improved. For example, the liquid is a lubricant, such as an oil-based lubricant or a water-based lubricant or silicone-based lubricant. For example, the liquid is a coolant, such as a water or an oil-water emulsion. For example, the liquid is a cutting fluid that is designed specifically for cooling and lubrication in metalworking processes.

In an embodiment, the rotation device comprises a liquid inlet to provide the liquid from a liquid supply to the rotation device.

According to this embodiment, the rotation device receives the liquid from a liquid supply. For example, the liquid supply has a reservoir to store an amount of liquid prior to providing the liquid to the rotation device. The liquid supply is connected to the rotation device to provide the liquid via the liquid inlet. The liquid inlet is, for example, an opening in a housing of the rotation device. The liquid inlet, for example, comprises multiple openings. The liquid inlet comprise, for example, a system of channels and openings to provide the liquid at various locations in the rotation device. The liquid inlet is, for example, to spray the liquid or to drip the liquid into the rotation device.

In an embodiment, the liquid inlet is arranged to supply the liquid to the target component. The rotation device is adapted to guide at least part of the liquid via the target component to the sealing device. The sealing device is adapted to direct the at least part of the liquid back to the target component.

According to this embodiment, the liquid inlet supplies the liquid to the target component. At the target component, the liquid provides lubrication and/or heat exchange with the target component. Then, the liquid flows away from the target component. The rotation device is adapted to guide the liquid from the target component to the sealing device. For example, the rotation device has channels or grooves or protrusions to guide a flow of the liquid from the target component to the sealing device. The rotation device uses, for example, gravity to generate the flow of the liquid. When the fluid reaches the sealing device, the liquid is directed by the sealing device back to the target component. For example, the liquid contacts the same part of the target component that the liquid contacted when flowing from the liquid inlet. In an example, the liquid contacts another part of the target component. By redirecting the liquid back to the target component, the heat transfer and/or lubrication is improved. For example, the liquid inlet provides the liquid at first side of the target component, whereas the sealing device provides the liquid at a second side of the target component opposite to the first side. In an example, the rotation device has a liquid outlet to remove the liquid from the rotation device. By removing the liquid via the liquid outlet, fresh liquid can be provided continually via the liquid inlet without flooding the rotation device with liquid.

In an embodiment, the rotation device comprises a further component. The liquid inlet is arranged to supply the liquid to the further component. The rotation device is adapted to guide at least part of the liquid via the further component to the sealing device. The sealing device is adapted to direct the at least part of the liquid to the target component.

According to the embodiment, the rotation device has a further component. The further component is, for example, similar to the target component, or is a component entirely different from the target component. For example, the target component and the further component both are electric coils or both gears or both bearings. In an example, the target component is an electric coil, whereas the further component is a gear or a bearing. In an example, the target component is a gear or a bearing, whereas the further component is an electric coil. The liquid inlet provides the liquid for heat transfer with the further component and/or for lubrication of the further component. Then, the liquid flows away from the further component. The rotation device has channels and/or fins and/or grooves and/or protrusions to guide the liquid to the sealing device. The sealing device directs the liquid away from the gap to the target component, which is not the further component. When the liquid contacts the target component, the liquid exchanges heat with the target component and/or lubricates the target component. The liquid is, for example, used to exchange heat with both the further component and the target component. The temperature of the liquid after contacting the further component should be low enough to be able to transfer heat from the target component. The liquid is, for example, used to lubricate both the further component and the target component.

In an embodiment, the liquid inlet is arranged to direct the fluid to the further component to perform one of exchanging heat between the further component and the fluid, and lubricating the further component with the fluid. The sealing device is adapted to perform the other of exchanging heat between the target component and the fluid, and lubricating the target component with the fluid.

According to the embodiment, the liquid first transfers heat from the further component or lubricates the further component. In case the liquid transfers heat from the further component, the liquid lubricates the target component. In case the liquid lubricates the further component, the liquid transfers heat from the target component. When the liquid transfers heat from the further component, the temperature of the liquid increases. Due to the increased temperature, the liquid would be less effective in transferring heat from the target component. However, the liquid is still very effective in lubricating the target component. When the liquid lubricates the further component, some particles or dirt may be included in the liquid. Due to the particles or dirt, the liquid is less effective in lubricating the target component. However, the liquid is still very effective in transferring heat from the target component. So by using the liquid once for transferring heat and once for lubrication, the liquid is used in a very effective way.

In an embodiment, the liquid inlet is adapted to provide a jet of liquid to the target component.

According to the embodiment, a jet of liquid is provided to the target component by the liquid inlet. A jet of liquid is advantageous to effectively deliver a large amount of liquid to the target component and/or to deliver the liquid at a high speed to the target component. The large amount of liquid provides a large heat capacity to remove heat from the target component. The high speed of the liquid provides a good heat conductance between the liquid and the target component. By using a jet, the liquid can be directed in any desired direction, even against gravity. However, the jet of liquid causes splashing as the jet hits the target component. In known rotation devices, the splashing would cause a risk that the liquid enters the gap. However, because the sealing device seals the gap against the liquid and directs the liquid to the target component, jets with a smaller flow rate can be used to achieve the desired heat transfer and/or lubrication. The smaller flow rate results in less splashing. Any or most liquid that ends up near the gap is removed away from the gap by the sealing device.

In an embodiment, the liquid comprises at least one of oil and water.

According to this embodiment, oil and/or water is present in the liquid. Oil and water have very good heat transfer properties and lubrication properties. A large variety of oil-based coolants, oil-based lubricants, water-based coolants and water-based lubricants are commercially available.

In an embodiment, the stator is arranged radial outward of the rotor to form the gap as a radial gap between the rotor and the stator.

For example, the stator is provided with a bore in which the rotor is arranged. The radial gap is radially outward of the rotor and radially inward of the stator. The radial gap has, for example, substantially the same height along the circumference of the rotor. The radial gap, for example, differs along the rotational axis. For example, along the rotational axis, some parts of the radial gap have a larger height than other parts. The radial gap is, for example, adapted to provide a suitable gap for a hydrostatic air bearing. The hydrostatic air bearing is arranged to rotatably support the rotor relative to the stator. The radial gap is, for example, adapted to provide a suitable gap for a magnetic bearing. The magnetic bearing is arranged to rotatably support the rotor relative to the stator. The radial gap is, for example, sufficiently large to prevent contact between the rotor and the stator via the radial gap due to manufacturing tolerances and deformations during operational use of the rotational device.

In an embodiment, the sealing device is adapted to contactless seal the gap against the fluid.

According to the embodiment, the sealing device does not make any physical contact with the stator. The sealing device does not have a part that contacts both the rotor and the stator. A space between the stator and the sealing device arranged on the rotor is for example filled by the flow generated with the sealing device. The sealing device has, for example, a labyrinth seal. A labyrinth seal provides a tortuous path between the stator and the rotor to reduce or prevent the fluid from entering the gap via the tortuous path. The tortuous path is for example formed by a series of grooves in one of the rotor and stator, and a series of protrusions corresponding to the grooves in the other of the rotor and the stator. A contactless seal does not create friction and has long lifetime. A contactless seal is especially well suited for applications with a high rotational speed of the rotor.

In an embodiment, the sealing device has a sealing surface. The sealing surface extends along the rotation axis from a first radial dimension to a second radial dimension larger than the first radial dimension. The sealing surface is adapted to direct the fluid away from the gap towards the target component.

According to this embodiment, the sealing surface has a first radial dimension and a second radial dimension. The second radial dimension is larger than the first radial dimension. When the rotor rotates, the sealing devices rotates as well. While rotating, the sealing device drags fluid along the sealing surface from the part of the sealing surface with the first radial dimension to the part with the second radial dimension. Due to the difference between the first radial dimension and the second radial dimension, the sealing surface acts as a pump to pump fluid along the sealing surface. Due to the velocity of the fluid at the part of the sealing surface with the second radial dimension, the fluid is sent away from the sealing surface and towards the target component. For example, the part of the sealing surface with the first radial dimension is closer to the gap than the part with the second radial dimension. For example, the part of the sealing surface with the first radial dimension is arranged along the rotation axis between the gap and the part of the sealing surface with the second radial dimension. The shape of the sealing surface is formed to direct the fluid from the sealing surface to the target component. For example, the shape of the sealing surface is determined by a difference between the first radial dimension and the second radial dimension, and the distance between the part of the sealing surface with the first radial dimension and with the second radial dimension along the rotation axis.

In an embodiment, the second radial dimension is larger than an outer radial dimension of the rotor.

According to the embodiment, the sealing device extends radially outward of the rotor. Because the second radial dimension is larger than the outer radial dimension of the rotor, the sealing surface is able to accelerate the fluid on the sealing surface with a high acceleration when the rotor is rotating. With the high acceleration, the sealing surface is able to displace a large amount of the fluid.

In an embodiment, the first radial dimension is smaller than an outer radial dimension of the rotor.

Because the first radial dimension is smaller than the outer radial dimension of the rotor, an additional barrier is created. The additional barrier helps to prevent the fluid from entering the gap.

In an embodiment, the sealing surface is curved.

According to the embodiment, the sealing surface is curved to smoothly accelerate the fluid along the sealing surface, resulting in an optimized flow of the fluid towards the target component.

In an embodiment, the sealing surface has a tangent line at the second radial dimension. The tangent line is directed at a target surface of the target component. The target surface and the sealing surface are arranged at an offset along the rotational axis relative to each other.

According to the embodiment, the target surface and the sealing surface are separated from each other over a distance along the rotation axis. In addition, for example, the target surface and the sealing surface are separated from each other over a radial distance. The tangent line of the part of the sealing surface at the second radial dimension is directed at the target surface of the target component. For example, along the rotation axis, the sealing surface is between the gap and the target surface.

In an embodiment, the sealing device comprises multiple blades arranged on the sealing surface. The blades are arranged to displace the fluid by rotation of the rotor.

According to this embodiment, the blades arranged on the sealing surface cause the fluid to be displaced by rotation of the rotor. By having the blades, the fluid is pumped with significantly more force per unit of rotation speed of the rotor compared to not having the blades. Depending on the desired flow rate of the fluid, the properties of the blades are selected. Such properties are, for example, the height and the length of the blades, and the angle of attack between the blade and rotation axis.

In an embodiment, the rotation device comprises a channel having an inlet and at least one outlet. The at least one outlet is arranged radially outward of the inlet. The channel is arranged to guide the further fluid from the inlet to the at least one outlet. The outlet is arranged relative to the gap to seal the gap with the further fluid against a fluid.

According to the embodiment, the further fluid flows through the channel. The further fluid is for example a clean gas, such as clean air or clean nitrogen. A clean gas has no or very little particles. The clean gas is for example a dry gas with no or very little water vapor. The further fluid is, for example, ambient air. The further fluid exits the channel via one or more outlets. The outlet or outlets are arranged such that the further fluid helps to further seal the gap against the fluid. For example, multiple outlets are arranged just outside the gap, such as adjacent to the gap. The multiple outlets create a flow of the further fluid that compliments the flow generated by the sealing device in a combined flow. The combined flow provides a stronger barrier between the fluid and the gap to prevent the fluid from entering the gap. The rotation device comprises, for example, a pump to provide the further fluid through the channel. In an example, the centrifugal force created by the rotation of the rotor causes the further fluid to flow through the channel. The centrifugal force causes acceleration of the further fluid near the outlet, because the outlet is radially outward of the inlet. Because of this acceleration, the further fluid is drawn through the channel. In an example, the flow of the further fluid is partly caused by a pump and partly by the centrifugal force created by the rotation of the pump.

In an embodiment, the at least one outlet is arranged in the gap.

According to the embodiment, the outlet or outlets are arranged in the gap. Via the outlet, the further fluid is provided in the gap. The flow of the further fluid through the gap helps to prevent or minimize fluid entering the gap. So even if some fluid is able to pass the sealing device, the further fluid is able to prevent the fluid from entering the gap or to remove the fluid from the gap. For example, a further outlet is arranged in the stator to provide a third fluid in the gap.

In an embodiment, the at least one outlet is arranged in the sealing device.

According to the embodiment, the at least one outlet is arranged in the sealing device to combine the flow of the further flow with the flow generated by the sealing device. The combined flow provides an improved sealing of the gap. Also, the combined flow helps to direct the fluid towards the target component. For example, at least one outlet is arranged in the sealing device, and at least one outlet is arranged in the gap.

In an embodiment, the rotation device comprises a flow control device arranged in the channel. The flow control device is adapted to adjust a flow resistance in the channel for the further fluid in dependency of a rotational speed of the rotor.

According to the embodiment, the rotational speed of the rotor causes a centrifugal force on the further fluid in the channel. At a high rotational speed, the centrifugal force is large. The large centrifugal force causes a larger flow rate of the further fluid in the channel. In contrast, a low rotational speed of the rotor causes a small centrifugal force on the further fluid in the channel. The small centrifugal force causes a small flow rate of the further fluid in the channel. For a proper sealing, the flow rate of the further fluid may be too large at the high rotational speed and/or too small at the low rotational speed. Therefore, the flow control device controls the flow resistance in the channel in dependency of the rotational speed of the rotor. At a high rotational speed, the flow control device sets a high flow resistance, whereas at a low rotational speed, the flow control device sets a low flow resistance. As a result, the flow rate of the further fluid is equal or more equal for different rotational speeds of the rotor compared to the situation without the flow control device.

In an embodiment, the flow control device comprises a first channel part, a second channel part and a flow restriction element. The first channel part has a first channel cross-section. The second channel part is adjacent to the first channel part and has a second channel cross-section. The first channel cross-section is larger than the second channel cross-section. The flow control device guides the further fluid through the first channel part cross-section and the second channel part. The flow restriction element is arranged in the first channel part relative to the second channel part to restrict a flow of the further fluid between first channel part and the second channel part. The flow restriction element is movable relative to the second channel part by a centrifugal force caused by the rotational speed of the rotor.

According to the embodiment, the flow restriction element restricts the flow between the first channel part and the second channel part. When the flow restriction element is close to the second channel part, the position of the flow restriction element in combination with the small second channel cross-section causes a large flow resistance. When the flow restriction element is away from the second channel part, the flow restriction element does not create such a large flow resistance. For example, in that case, the flow resistance of the flow control device is mostly or completely determined by the second channel cross-section. For example, the flow restriction element extends partly into the second channel part. For example, the second channel comprises multiple channels. For example, one of the multiple channels is restricted by the flow restriction element, whereas another of the multiple channels is not restricted by the flow restriction element. For example, the shape of the flow restriction element is adapted to prevent the flow restriction element from completely blocking the flow of the further fluid to the second channel part.

In an embodiment, the flow control device comprises an elastic element. The elastic element couples the flow restriction element to the channel. The elastic element is arranged to elongate and/or shorten in response to the centrifugal force caused by the rotational speed of the rotor.

According to the embodiment, the flow restriction element is coupled to the channel via the elastic element. A centrifugal force caused by the rotation of rotor, causes a force on the flow restriction element due to the mass of the flow restriction element. The force is able to move the flow restriction element by elongating or shortening the elastic element. A large centrifugal force causes a large elongation or shortening of the elastic element and thus a large displacement of the flow restriction element. A small centrifugal force causes a small elongation or shortening of the elastic element and thus a small displacement of the flow restriction element. The stiffness of the elastic element is chosen to achieve a desired displacement of the flow restriction element in relation to the centrifugal force. The stiffness of the elastic element is, for example, chosen by forming the elastic element with a certain length, thickness, or from a certain elastic material. The elastic element is, for example, linear elastic or non-linear elastic. The elastic element is, for example, able to elongate or shorten along a radial direction. The elastic element is, for example, arranged radially inward of the flow restriction element. In this example, the elastic element elongates when the centrifugal force is increased. The elastic element is, for example, arranged radially outward of the flow restriction element. In this example, the elastic element shortens when the centrifugal force is increased.

In an example, the flow restriction element is coupled to the channel via the elastic element and a damper. The damper helps to reduce the speed at with the flow restriction element is able to move. By reducing the speed, the flow of the further fluid through the flow control device changes gradually in case the rotational speed of the rotor changes suddenly. By changing the flow of the further fluid gradually, the further flow is provided as a stable, smooth flow. The stable, smooth flow improves the sealing against the fluid. The elastic element and the damper are provided as separated elements, or are integrated in a single element.

In an embodiment, the flow restriction element is moveable in a radial direction of the rotor.

According to the embodiment, the flow restriction element is able to move in the radial direction of the rotor. Because the centrifugal force caused by the rotation of the rotor is also directed in the radial direction of the rotor, the movement of the flow restriction element and the centrifugal force are aligned. This allows accurate movement of the flow restriction element in relationship to the centrifugal force.

In an embodiment, the target component is one of a bearing, an electric coil and a gear.

According to this embodiment, the target component especially benefits from the heat exchange and/or lubrication provided by the fluid if the target component is a bearing, an electric coil or a gear. Improved lubrication of a bearing increases the lifetime of the bearing. The fluid may not only improve lubrication, but may also help to wash out any particles from the bearing. The performance of an electric coil is typically limited by the maximum acceptable temperature of the electric coil. Also, the electrical resistance of an electric coil increases with the temperature. So, by improving the heat transfer from the electric coil with the fluid, a larger electric current is allowed to flow through the electric coil and electric losses are reduced. The larger electric current improves the power density of the electric coil. The gear has teeth that contact the teeth of another component, such as another gear or a rack. The friction of the physical contact between the teeth is minimized by providing the fluid as lubrication. The gear is, for example, a spur gear or a helical gear or a bevel gear or any other type of gear. Optionally, the gear has a radial dimension that is larger than the second radial dimension of the sealing surface.

In an embodiment, there is provided an electric motor or electric generator comprising the rotation device according to any one of the embodiments, and a plurality of electric coils. The stator comprises the plurality of electric coils. The target component comprises at least one of the plurality of electric coils.

According to the embodiment, an electric motor or an electric generator is provided. An electric motor converts electric energy into mechanical energy, whereas an electric generator converts mechanical energy into electric energy. Structurally, an electric motor and an electric generator are very similar. For example, some electric motors are able to function as an electric generator and vice versa. Some electric cars have an electric motor that functions as an electric generator during regenerative breaking of the electric car. Due to the electric current through the electric coils, the electric coils become hot. The maximum duty cycle of the electric coils, i.e., how much electric current can flow through the electric coils per unit of time, is limited by a maximum temperature of the electric coil. By improving the heat transfer from the electric coil to the fluid, the maximum duty cycle is increased while maintaining the same maximum temperature of the electric coil.

In an embodiment, there is provided a gear box comprising the rotation device according to any one of the embodiments and a gear. The gear is coupled to the rotor. The target component comprises the gear.

According to the embodiment, by providing the fluid to the gear of a gear box, the performance of the gear box is improved.

In an embodiment, there is provided a turbomachine comprising the rotation device according to any one of the embodiments.

According to the embodiment, a turbomachine is a machine that converts energy from a flow of a liquid or a flow of gas to a rotation of the rotor, or vice versa. The turbomachine has blades arranged on the rotor. The blades on the rotor interact with the flow of liquid or gas. The turbomachine is, for example, a turbopump or a turbo compressor.

In an embodiment, there is provided a flow control device for use in the rotation device according to any one of the embodiments.

In a second aspect of the invention, there is provided a flow control device for use in a rotation device according to the first aspect of the invention. The rotation device has rotatable rotor and a channel that is rotatable with the rotor. The flow control device is adapted to be arranged in the channel. The flow control device is adapted to adjust a flow resistance in the channel for a further fluid in dependency of a rotational speed of the rotor.

According to the second aspect, the rotational speed of the rotor causes a centrifugal force on the further fluid in the channel. At a high rotational speed, the centrifugal force is high, causing a large flow rate of the further fluid in the channel. In contrast, a low rotational speed, at which the centrifugal speed is low, causes a small flow rate of the further fluid in the channel. The flow rate of the further fluid may be too large at the high rotational speed and/or too small at the low rotational speed. Therefore, the flow control device controls the flow resistance in the channel in dependency of the rotational speed of the rotor. At a high rotational speed, the flow control device sets a high flow resistance, whereas at a low rotational speed, the flow control device sets a low flow resistance. As a result, the flow rate of the further fluid is equal or more equal for different rotational speeds of the rotor compared to the situation without the flow control device.

In an embodiment, the flow control device comprises a first channel part, a second channel part and a flow restriction element. The first channel part has a first channel cross-section. The second channel part is adjacent to the first channel part and has a second channel cross-section. The first channel cross-section is larger than the second channel cross-section. The flow control device guides the further fluid through the first channel part cross-section and the second channel part. The flow restriction element is arranged in the first channel part relative to the second channel part to restrict a flow of the further fluid between first channel part and the second channel part. The flow restriction element is movable relative to the second channel part by a centrifugal force caused by the rotational speed of the rotor.

According to the embodiment, the flow restriction element restricts the flow between the first channel part and the second channel part. When the flow restriction element is close to the second channel part, the position of the flow restriction element in combination with the small second channel cross-section causes a large flow resistance. When the flow restriction element is away from the second channel part, the flow restriction element does not create such a large flow resistance. For example, in that case, the flow resistance of the flow control device is mostly or completely determined by the second channel cross-section. For example, the flow restriction element extends partly into the second channel part. For example, the second channel comprises multiple channels. For example, one of the multiple channels is restricted by the flow restriction element, whereas another of the multiple channels is not restricted by the flow restriction element.

In an embodiment, the flow control device comprises an elastic element. The elastic element couples the flow restriction element to the channel. The elastic element is arranged to elongate and/or shorten in response to the centrifugal force caused by the rotational speed of the rotor. In an example, the flow restriction element is coupled to the channel via the elastic element and a damper. The damper helps to reduce the speed at with the flow restriction element is able to move. By reducing the speed, the flow of the further fluid through the flow control device changes gradually in case the rotational speed of the rotor changes suddenly. By changing the flow of the further fluid gradually, the further flow is provided as a stable, smooth flow. The stable, smooth flow improves the sealing against the fluid. The elastic element and the damper are provided as separated elements, or are integrated in a single element.

According to the embodiment, the flow restriction element is coupled to the channel via the elastic element. A centrifugal force caused by the rotation of rotor, causes a force on the flow restriction element due to the mass of the flow restriction element. The force is able to move the flow restriction element by elongating or shortening the elastic element. A large centrifugal force causes a large elongation or shortening of the elastic element and thus a large displacement of the flow restriction element. A small centrifugal force causes a small elongation or shortening of the elastic element and thus a small displacement of the flow restriction element. The stiffness of the elastic element is chosen to achieve a desired displacement of the flow restriction element in relation to the centrifugal force. The stiffness of the elastic element is, for example, chosen by forming the elastic element with a certain length, thickness, or from a certain elastic material. The elastic element is, for example, linear elastic or non-linear elastic. The elastic element is, for example, able to elongate or shorten along a radial direction of the rotor. The elastic element is, for example, arranged radially inward of the flow restriction element. In this example, the elastic element elongates when the centrifugal force is increased. The elastic element is, for example, arranged radially outward of the flow restriction element. In this example, the elastic element shortens when the centrifugal force is increased.

In an embodiment, the flow restriction element is adapted to be moveable in a radial direction of the rotor.

In an embodiment, there is provided a rotor arranged to rotate along a rotation axis, wherein the rotor comprises a channel having an inlet and at least one outlet, wherein the at least one outlet is arranged radially outward of the inlet, wherein the channel is arranged to guide a fluid from the inlet to the at least one outlet, wherein the outlet is arranged relative to the rotor to direct a further fluid away from the rotor with the fluid. The rotor further comprises a flow control device arranged in the channel, wherein the flow control device is adapted to adjust a flow resistance in the channel for the fluid in dependency of a rotational speed of the rotor.

Figure 2:
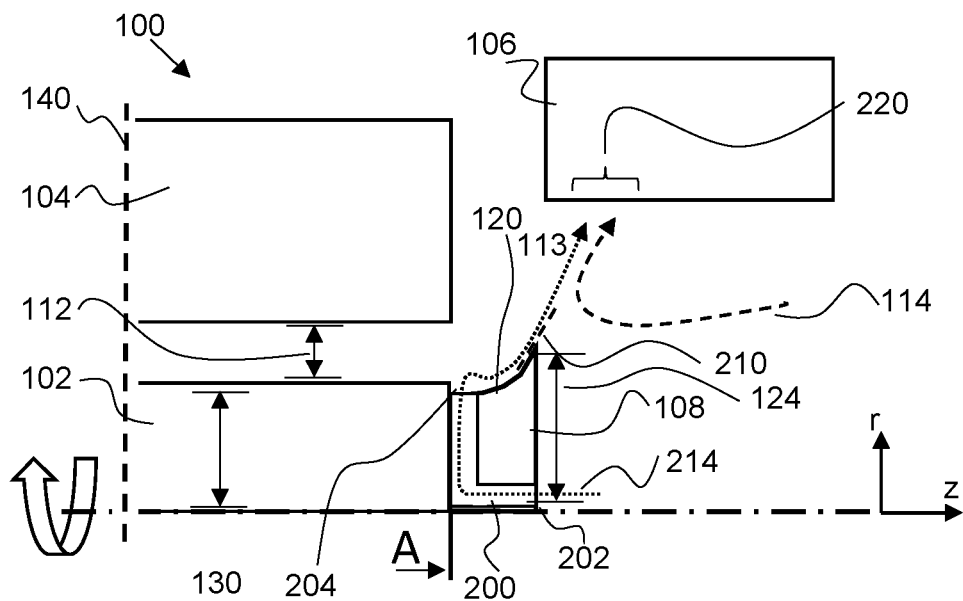
Figure 3A:
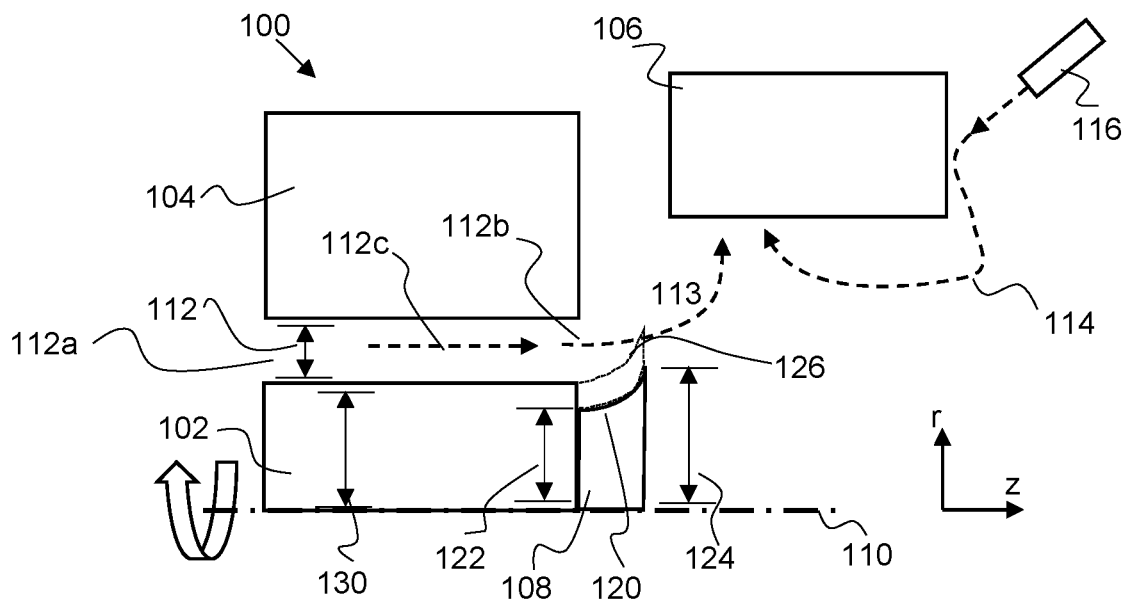
Figure 3B:
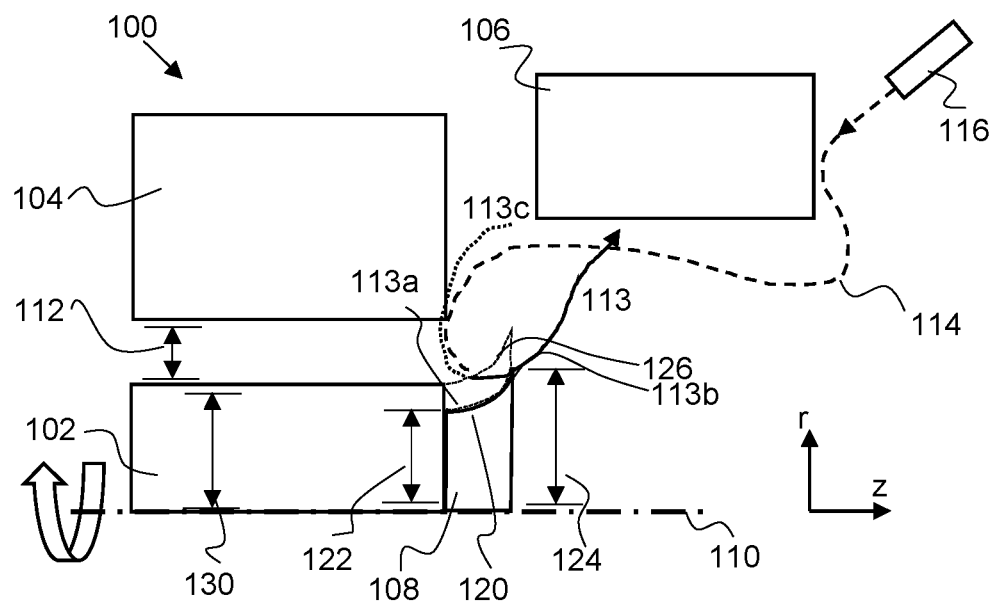
Figure 3C:
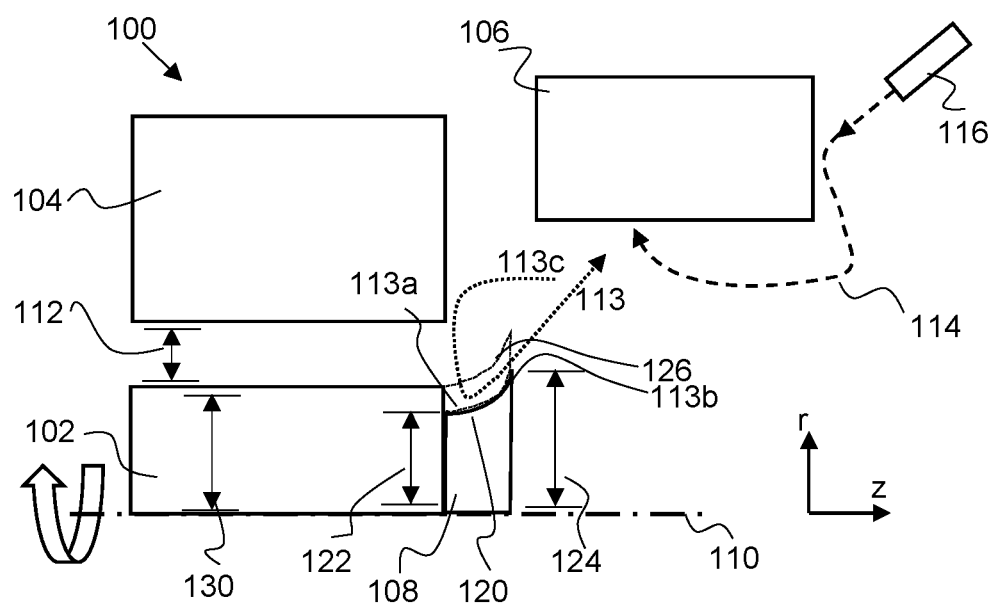
Figure 4:
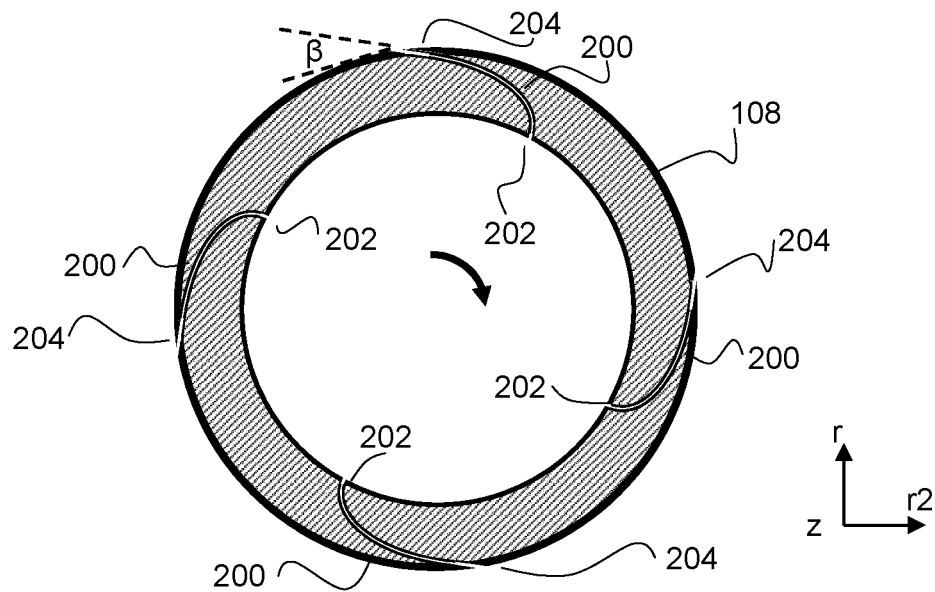
Figure 5:
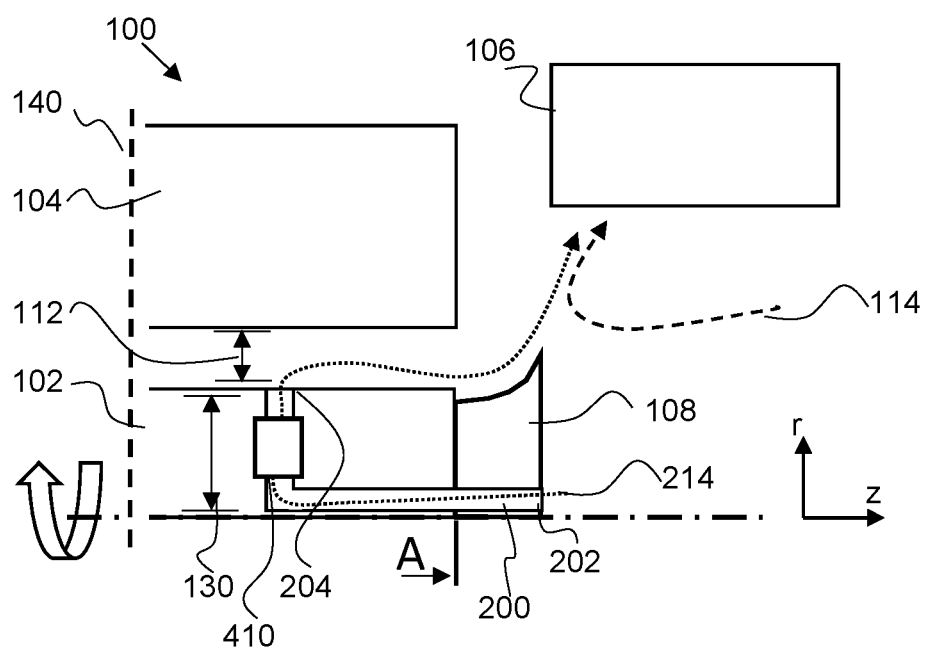
Figure 6:
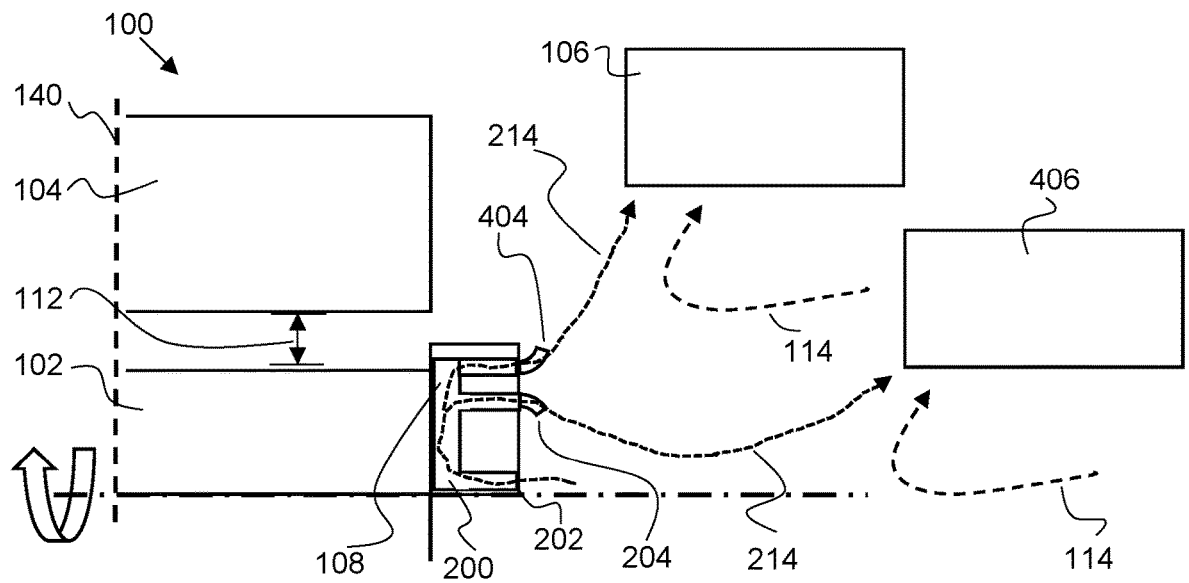
Figure 7:
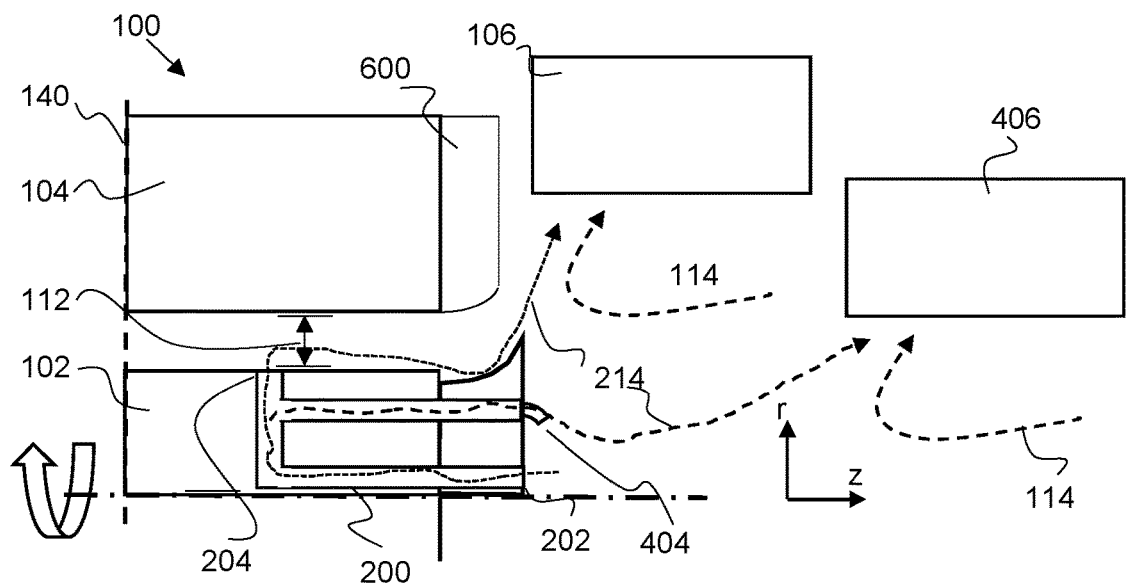
Figure 10:
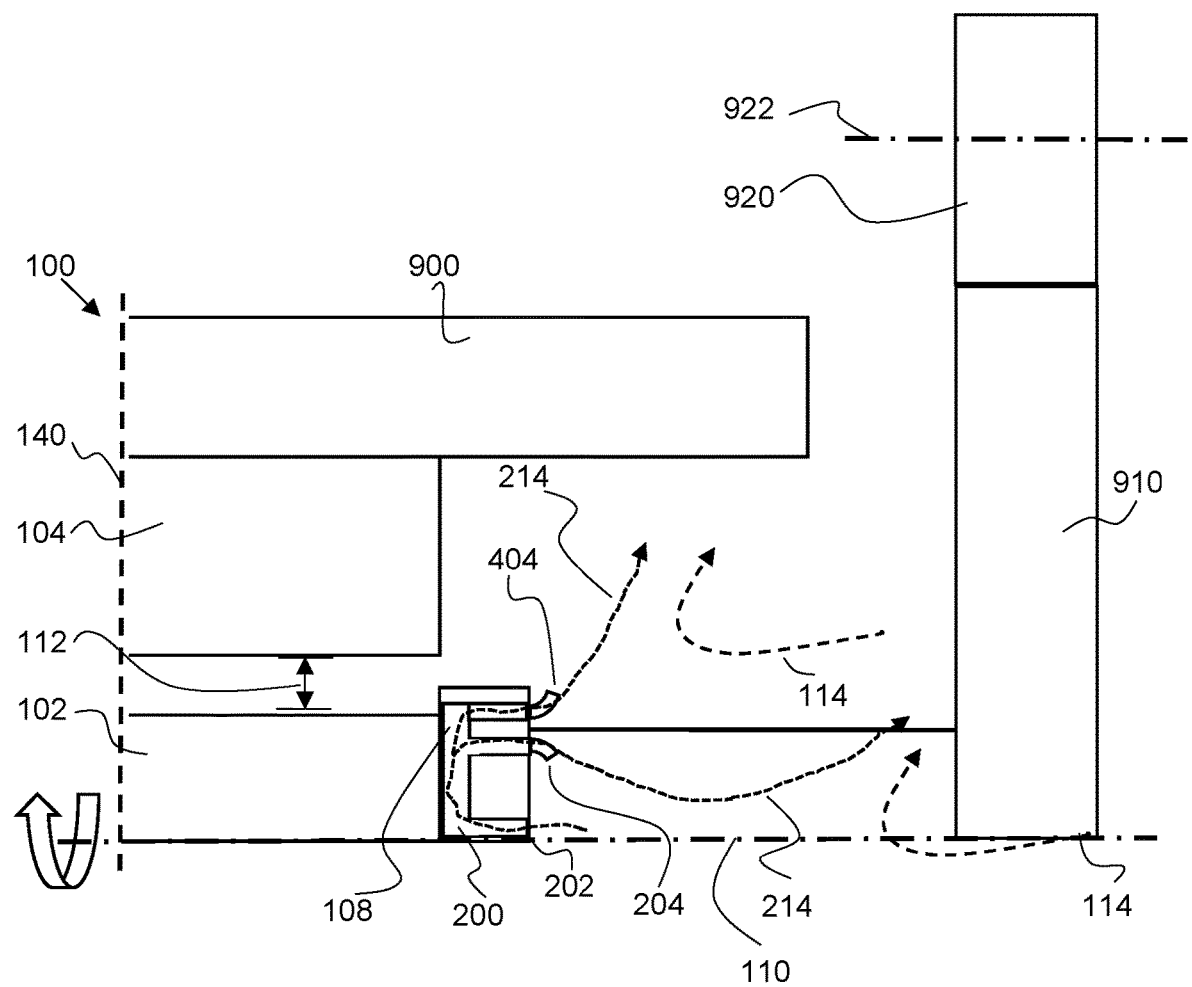
Figure 11A:
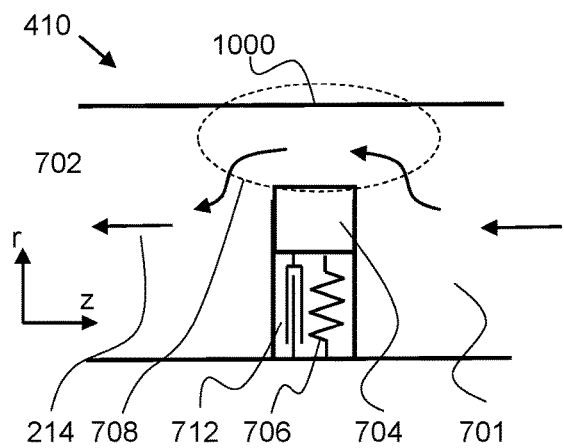
Figure 11B:
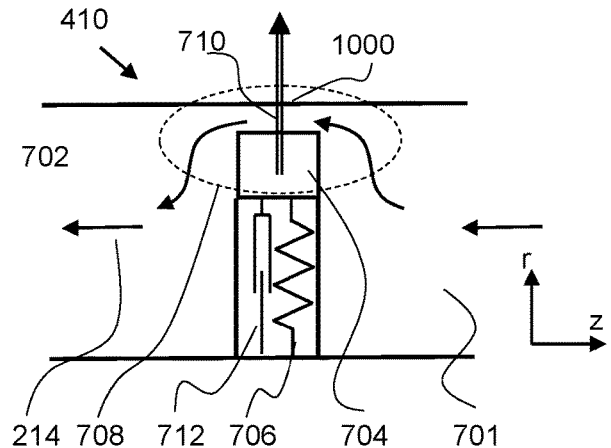
Figure 12:
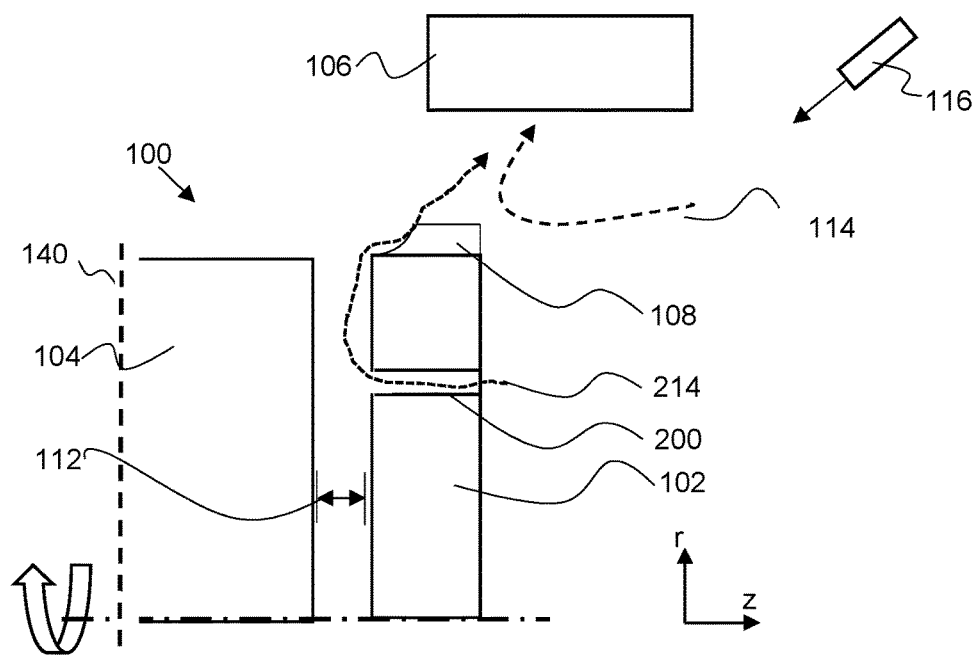

The invention will be described in more detail below with reference to the figures. In the figures embodiments of the invention are shown. The figures show in:

FIG. 1: a first embodiment according to the invention.
FIG. 2: a second embodiment according to the invention.
FIGS. 3A-3C: a third embodiment according to the invention.
FIG. 4: a cross-section of the sealing device of the second embodiment.
FIG. 5: a fourth embodiment according to the invention.
FIG. 6: a fifth embodiment according to the invention.
FIG. 7: a sixth embodiment according to the invention.
FIGS. 8A and 8B: a flow control device according to an embodiment of the invention.
FIGS. 9A and 9B: a front view of blades for use in any of the embodiments.
FIG. 10: a seventh embodiment according to the invention.
FIGS. 11A and 11B: a flow control device according to another embodiment of the invention.
FIG. 12: an eighth embodiment according to the invention.

FIG. 1 depicts a first embodiment according to the invention. FIG. 1 shows part of a rotation device 100 according to the first embodiment. The part that is shown is between a rotation axis 110 and a break line 140. The rotation device 100 continues beyond the rotation axis 110 and the break line 140. A cylindrical coordinate system is shown with a z-axis and a r-axis. The z-axis is the longitudinal axis of the rotor 102, which is aligned with the rotation axis 110. The r-axis indicates a radial direction.

The first embodiment of the rotation device 100 has a rotor 102, a stator 104, a target component 106 and a sealing device 108. The rotor 102 is arranged to rotate along a rotation axis 110 relative to the stator 104. The stator 104 is arranged radial outward of the rotor 102 to form a gap 112 between the rotor 102 and the stator 104. The gap 112 is a radial gap. The sealing device 108 is attached to the rotor 102 to hydrodynamically seal the gap 112 against a fluid 114. The sealing device 108 is adapted to direct the fluid 114 to the target component 106 to exchange heat between the target component 106 and the fluid 114, and/or to lubricate the target component 106 with the fluid 114. The fluid 114 is a liquid such as oil or water.

The rotation device 100 comprises a liquid inlet 116 to provide the fluid 114 from a liquid supply to the rotation device 100. The liquid inlet 116 is arranged to supply the fluid 114 to the target component 106, for example to cool the target component 106. After the fluid 114 contacts the target component 106, the fluid 114 splashes or drips or flows from the target component 106. The rotation device 100 is adapted to guide at least part of the fluid 114 via the target component 106 to the sealing device 108. The sealing device 108 is adapted to direct the at least part of the fluid 114 back to the target component 106, as is indicated by the dashed arrows.

For example, the liquid inlet 116 is adapted to provide the fluid 114 as a jet of liquid to the target component 106.

The sealing device 108 has a sealing surface 120. The sealing surface 120 forms an outer radial surface of the sealing device 108. The sealing surface 120 extends along the rotation axis 110 from a first radial dimension 122 to a second radial dimension 124. The second radial dimension 124 is larger than the first radial dimension 122. The sealing surface 120 is adapted to direct the fluid 114 away from the gap 112 towards the target component 106. The sealing surface 120 directs the fluid 114 in a radial outward direction.

The second radial dimension 124 is larger than an outer radial dimension 130 of the rotor 102. The first radial dimension 122 is smaller than an outer radial dimension 130 of the rotor 102. The sealing surface 120 is curved.

The sealing device 108 comprises multiple blades 126 arranged on the sealing surface 120. The blades 126 are arranged to displace the fluid 114 by rotation of the rotor 102. The blades 126 are indicated by dashed lines to show that the fluid 114 flows in between the multiple blades 126 along the sealing surface 120. By rotation of the rotor 102, the blades 126 help to accelerate the fluid 114 towards the target component 106. In an alternative embodiment, no blades 126 are arranged on the sealing surface 120.

For example, the sealing device 108 is adapted to contactless seal the gap 112 against the fluid 114.

The rotation device 100 is adapted to guide a flow 113 from the sealing device 108 to the target component 106, wherein the sealing device 108 is adapted to direct the fluid 114 and/or a further fluid to the target component 106. The further fluid is for example a clean gas, such as clean air of clean nitrogen. A clean gas has no or very little particles. The clean gas is for example a dry gas with no or very little water vapor. In the embodiment of FIG. 1, the further fluid comprises a stator fluid 150a.

The stator 104 is provided with a stator channel 150 to provide the stator fluid 150a to the gap 112. The stator channel 150 is arranged to guide the stator fluid 150a from a stator inlet 151 to a stator outlet 152. The stator outlet 152 is arranged radially inward of the stator inlet 151. The stator outlet 152 is arranged relative to the gap 112 to seal the gap 112 with the stator fluid 150a against the fluid 114. The stator fluid 150a is for example air present in the stator channel 150. Instead of air, the stator fluid 150a can also be another fluid in a vapor or gas phase. By providing the stator fluid 150a via the stator channel 150 to the gap 112, the stator fluid 150a helps to prevent the fluid 114 from entering the gap 112.

Optionally, an external fluid supply is provided (not shown in the figure). The external fluid supply is configured to provide an additional fluid, e.g. air, to the stator channel 150. The external fluid supply further helps to prevent the fluid 114 from entering the gap 112.

FIG. 2 depicts a second embodiment according to the invention. The second embodiment is, for example, the same as the first embodiment, except for the following. In the second embodiment, no blades 126 are arranged on the sealing surface 120. Alternatively, blades 126 are arranged on the sealing surface 120.

The rotation device 100 comprises a channel 200 having an inlet 202 and at least one outlet 204. One outlet 204 is shown in the figure. The outlet 204 is arranged radially outward of the inlet 202. The channel 200 is arranged to guide the further fluid 214 from the inlet 202 to the at least one outlet 204. The outlet 204 is arranged relative to the gap 112 to seal the gap 112 with the further fluid 214 against a fluid 114. The outlet 204 is arranged in the sealing device 108. The further fluid 214 is, for example, a gas such as air or the gas-phase part of a refrigerant. The sealing device 108 uses the further fluid 214 from the outlet 204 to direct the fluid 114 away from the gap 112 and towards the target component 106.

The sealing surface 120 has a tangent line 210 at the second radial dimension 124. The tangent line 210 is directed at the target component 106. The tangent line 210 is directed at a target surface 220 of the target component 106. The target surface 220 and the sealing surface 120 are arranged at an offset along the rotational axis relative to each other. As shown in the figure, the sealing surface 120 is left of the target surface 220 at which the fluid 114 is directed.

FIG. 3A depicts a third embodiment according to the invention. The third embodiment is the same as the first embodiment and/or the second embodiment, except for the following. In the second embodiment, no stator channel 150 is provided in the stator (FIG. 1) and/or no channel 200 is provided in the rotation device (FIG. 2). The rotation device is further considered asymmetric, meaning that no second sealing device is attached to the rotor opposite to the sealing device 108.

In FIG. 3A, the further fluid comprises a gap fluid 112c. The gap fluid 112c is configured to flow through the gap 112. The gap 112 comprises a gap inlet 112a and a gap outlet 112b. The gap inlet 112a and the gap outlet 112b are arranged axial outward relative to the rotor 102 and the stator 104. The gap 112 is adapted to guide the gap fluid 112c from the gap inlet 112a to the gap outlet 112b. The gap fluid 112c is for example air present in the gap 112. Instead of air, the gap fluid 112c can also be another fluid in a vapor or gas phase. The sealing device 108, which is e.g. arranged at or near the gas outlet 112b, receives the gap fluid 112c and directs the gap fluid 112c exiting the gas outlet 112b towards the fluid 114, in order to deflect the fluid 114 to the target component 106. Due to rotation of the rotor 102, the gap fluid 112c, e.g., air, is pushed out of the gap outlet 112b, because of the centrifugal force. As a result of the gap outlet 112b being directed outwardly and the curvature of the sealing surface 120 of the sealing device 108, the gap fluid 112c exiting the gap outlet 112b is directed to the target component 106. The rotation device 100 uses the gap fluid 112c to direct the fluid 114 away from the gap 112 and towards the target component 106.

FIG. 3B depicts an alternative third embodiment according to the invention. The embodiment FIG. 3B is the same as the embodiment of FIG. 3A, except for the following.

In the embodiment of FIG. 3B, the flow 113 from the sealing device 108 to the target component 106 is a mixture or combination of surrounding fluid 113c (e.g. air) and the fluid 114 (e.g. oil). Optionally, the flow 113 comprises the gap fluid 112c. The surrounding fluid 113c may originate from other locations outside the rotor 102 and stator 104. The surrounding fluid 113c is for example an air flow flowing between the stator 104 and the target component 106. The flow 113 enforced by the centrifugal forces leads to a higher pressure zone 113a and a lower pressure zone 113b on the sealing surface 120. When the rotor is rotating a flowing pattern of the flow 113 as shown in FIG. 3B is created. Because of the centrifugal force, the flow 113 is being directly targeted to the target component 106 by the sealing device 108, e.g. for either cooling or lubrication of the target component 106.

In FIG. 3B the rotation device 100 is depicted as being asymmetric. Alternatively, the rotation device 100 is symmetric having a second sealing device attached to the rotor 102 opposite to the sealing device 108 (not shown in the figure).

FIG. 3C depicts an alternative third embodiment according to the invention. The embodiment FIG. 3C is the same as the embodiments of FIG. 3A-3B, except for the following.

In the embodiment of FIG. 3C, the flow 113 from the sealing device 108 to the target component 106 comprises the surrounding fluid 113c (e.g. air). Optionally, the flow 113 comprises the gap fluid 112c. The surrounding fluid 113c may originate from other locations outside the rotor 102 and stator 104. The surrounding fluid 113c is for example an air flow flowing between the stator 104 and the target component 106. The flow 113 enforced by the centrifugal forces lead to a higher pressure zone 113a and a lower pressure zone 113b on the sealing surface 120. When the rotor is rotating a flowing pattern of the flow 113 as shown in FIG. 3C is created. Because of the centrifugal force, the flow 113 is being targeted to the fluid 114 in order to deflect the fluid 114 to the target component 106, e.g. for either cooling or lubrication of the target component 106. The situation of FIG. 3c for example occurs when the amount of injected fluid 114 and/or the injection pressure of fluid 114 is kept relatively low such that fluid 114 will not form a mixture with the surrounding fluid 113c near the sealing surface 120.

In FIG. 3C the rotation device 100 is depicted as being asymmetric. Alternatively, the rotation device 100 is symmetric having a second sealing device attached to the rotor 102 opposite to the sealing device 108 (not shown in the figure).

FIG. 4 depicts a cross-section of the sealing device 108 of the second embodiment, according to "A" in FIG. 2. FIG. 4 depicts a cross-section of the sealing device 108 having four channels 200. Each of the four channels 200 has an inlet 202, and an outlet 204. The further fluid, e.g., air, is provided to the inlets 202. The channels 200 are curved to optimize the flow of air through the channels 200. The outlets 204 are arranged at the outer radial surface of the sealing device 108 at an angle β. The angle β is selected to direct the air from the channels 200 in the desired direction. The angle β is, for example, in the plane defined by r-r2, the plane defined by r-z, the plane defined by z-r2 or any combination thereof.

FIG. 5 depicts a fourth embodiment according to the invention. The fourth embodiment is the same as the first embodiment, the second embodiment and/or the third embodiment, except for the following.

The outlet 204 of the channel 200 is arranged inside the gap 112. The further fluid 214 flows from the inlet 202 along the channel 200 to the outlet 204. When the further fluid 214 exists the outlet 204, the further fluid 214 enters the gap 112. The further fluid 214 flows along the gap towards the sealing device 108. In addition, the further fluid 214 may flow in other directions as well. At the sealing device 108, the further fluid 214 is directed by the sealing device 108 to the target component 106.

FIG. 5 shows that the rotational device 100 has a flow control device 410 arranged in the channel 200. The flow control device 410 is adapted to adjust a flow resistance in the channel 200 for the further fluid 214 in dependency of a rotational speed of the rotor 102. More details about the flow control device 410 are given in the description about FIGS. 8A and 8B.

FIG. 6 depicts a fifth embodiment according to the invention. The fifth embodiment is the same as the first, second, third and/or fourth embodiment, except for the following.

The fifth embodiment has the sealing device 108. The sealing device 108 optionally has the sealing surface 120 as described above. The sealing device 108 is provided with the channel 200. The channel 200 has the inlet 202 and has multiple outlets. The channel 200 has the outlet 204 and the further outlet 404. Due to rotation of the rotor 102, the further fluid 214, e.g., air, is drawn into the channel 200 via the inlet 202, because of the centrifugal force. The further fluid 214 is divided over the outlet 204 and the further outlet 404. The outlet 204 is directed radially inward. As a result of the outlet 204 being directed radially inward, the further fluid 214 exiting the outlet 204 is directed radially inward as well. The further fluid exiting the outlet 204 continues in a straight line and flow eventually radially outward. Because the rotor 102 continues to rotate while the further fluid 214 continues to exit the outlet 204, a curve shaped flow is created. The curve shaped flow is indicated with the arrow. The further fluid 214 from the outlet 204 is directed to a further component 406 instead of to the target component 106. The further fluid 214 from the outlet 204 lubricates the further component 406 and/or transfers heat with the further component 406. The further outlet 404 is directed radially outward. As a result of the further outlet 404 being directed radially outward, the further fluid 214 exiting the further outlet 404 is directed radially outward as well. The further fluid 214 from the further outlet 404 is directed to the target component 106. The further fluid 214 from the further outlet 404 lubricates the target component 106 and/or transfers heat with the target component 106.

In the fifth embodiment, the liquid inlet 116 (not shown in the figure) is arranged to supply the fluid 114 to the further component 406. The rotation device 100 is adapted to guide at least part of the fluid 114 via the further component 406 to the sealing device 108. The sealing device 108 is adapted to direct the at least part of the fluid 114 to the target component 106.

For example, the liquid inlet 116 is arranged to direct the fluid 114 to the further component 406 to perform one of transferring heat from the further component 406 to the fluid 114 and lubricating the further component 406 with the fluid 114. The sealing device 108 is adapted to perform the other of transferring heat from the target component 106 to the fluid 114 and lubricating the target component 106 with the fluid 114.

FIG. 7 depicts a sixth embodiment according to the invention. The sixth embodiment is the same as the first, second, third, fourth and/or fifth embodiment, except for the following.

The sixth embodiment has the sealing device 108. The sealing device 108 has the sealing surface 120 as described above. The sealing device 108 is provided with the channel 200. The channel 200 has the inlet 202 and has multiple outlets. The channel 200 has the outlet 204 and the further outlet 404. Due to rotation of the rotor 102, the further fluid 214, e.g., air, is drawn into the channel 200 via the inlet 202, because of the centrifugal force. The further fluid 214 is divided over the outlet 204 and the further outlet 404. The outlet 204 is arranged in the gap 112. The further fluid 214 exiting the outlet 204 flows along the gap 112 towards the sealing device 108. The sealing device 108 directs the further fluid 214 from the outlet 204 towards the target component 106. The further outlet 404 is arranged in the sealing device 108 and is directed radially inward. As a result of the further outlet 404 being directed radially inward, the further fluid 214 exiting the further outlet 404 is directed radially inward as well. The further fluid 214 from the further outlet 404 is directed to the further component 406. The further fluid 214 from the further outlet 404 lubricates and/or transfers heat with the further component 406.

The sixth embodiment is provided with a flow guide 600 arranged on the stator 104. The flow guide 600 guides the flow of the further fluid 214 along the sealing device 108 towards the target component 106. The flow guide 600 helps to focus flow of the further fluid 214 on the target component 106.

FIGS. 8A and 8B depict a flow control device 410 according to an embodiment of the invention. The flow control device 410 may be used in any of the embodiments according to the invention that has the channel 200. The flow control device 410 is arranged in the channel 200. The flow control device 410 is adapted to adjust a flow resistance in the channel 200 for the further fluid 214 in dependency of a rotational speed of the rotor 102.

The flow control device 410 comprises a first channel part 701, a second channel part 702 and a flow restriction element 704. The first channel part 701 has a first channel cross-section. The second channel part 702 is adjacent to the first channel part 701 and has a second channel cross-section. The first channel cross-section is larger than the second channel cross-section. The flow control device 410 guides the further fluid 214 through the first channel part 701 and the second channel part 702. The flow restriction element 704 is arranged in the first channel part 701 relative to the second channel part 702 to restrict a flow of the further fluid 214 between first channel part 701 and the second channel part 702. The flow restriction element 704 is movable relative to the second channel part 702 by a centrifugal force 710 caused by the rotational speed of the rotor 102. The flow control device 410 comprises an elastic element 706 and a damper 712. The elastic element 706 couples the flow restriction element 704 to the channel 200. The damper 712 couples the flow restriction element 704 to the channel 200. The elastic element 706 is arranged to elongate in response to the centrifugal force 710 caused by the rotational speed of the rotor 102. The damper 712 limits the speed of the flow restriction element 704.

The centrifugal force 710 moves the flow restriction element 704 from the position as shown in FIG. 8A closer to the second channel part 702 and elongates the elastic element 706, as shown in FIG. 8B. Because the flow restriction element 704 is moved closer to the second channel part 702, a larger flow resistance is created in the restriction area 708. A larger pressure drop occurs in the further fluid 214 in the restriction area 708 in the situation of FIG. 8B than in the situation of FIG. 8A. By increasing the flow resistance in dependency of the centrifugal force 710, the flow of the further fluid 214 is not increased or only increase a small amount by the centrifugal force 710. Without the flow control device 410, the centrifugal force 710 would increase the flow of the further fluid 214.

FIGS. 9A and 9B depict a front view of blades for use in any of the embodiments described above. For example, the blades of FIGS. 9A and 9B replace the blades 126. The front view is along the rotation axis 110. The shape of the blades 126 are adjusted based on whether the rotor 102 is adapted to rotate in a single direction or in two directions. The blade 800 of FIG. 9A is optimized to displace the fluid 114 when the rotor rotates only in a single direction. The single direction is clock-wise in the figure. The blade 800 is non-symmetrical. The blade 810 of FIG. 9B is optimized to displace the fluid 114 when the rotor is able to rotate in both directions. The blade 810 is adapted to displace the fluid 114 when the rotor 102 rotates clock-wise and is adapted to displace the fluid 114 when the rotor 102 rotates counter-clock-wise. The blade 810 is symmetrical.

FIG. 10 depicts a seventh embodiment according to the invention. The seventh embodiment is the same as the first, second, third, fourth, fifth and/or sixth embodiment, except for the following.

The seventh embodiment has the sealing device 108. The sealing device 108 is provided with the channel 200. The channel 200 has the inlet 202 and has the outlet 204 and the further outlet 404. Due to rotation of the rotor 102, the further fluid 214, e.g., air, is drawn into the channel 200 via the inlet 202, because of the centrifugal force. The further fluid 214 is divided over the outlet 204 and the further outlet 404. The outlet 204 is directed radially inward. As a result of the outlet 204 being directed radially inward, the further fluid 214 exiting the outlet 204 is directed radially inward as well.

The rotation device comprises an electric coil 900 and a gear 910. The electric coil 900 forms the target component 106. The stator 104 comprises the electric coil 900. The gear 910 forms the further component 406. The gear 910 is coupled to the rotor 102 and rotates together with the rotor 102. The gear 910 cooperates with a further gear 920 that is rotatable along an axis 922 that is parallel to the rotation axis 110.

The further fluid 214 from the outlet 204 is directed to the gear 910 for lubrication of the gear 910.

The further outlet 404 is directed radially outward. As a result of the further outlet 404 being directed radially outward, the further fluid 214 exiting the further outlet 404 is directed radially outward as well. The further fluid 214 from the further outlet 404 is directed to the electric coil 900 for heat transfer with the electric coil 900.

FIGS. 11A and 11B depict a flow control device 410 according to another embodiment of the invention. This flow control device 410 is the same as the flow control device as disclosed in FIGS. 8A and 8B except for the following.

The flow control device 410 is arranged in an axial part of the channel 200. The further fluid 214 flows in an axial direction through the axial part of the channel 200. The flow restriction element 704 is arranged between the first channel part 701 and the second channel part 702. The flow restriction element 704 is adapted to guide the further flow 214 from the first channel part 701 to the second channel part 702 through a cross-section defined by the flow restriction element 704 and a wall 1000 of the channel 200, as indicated by the arrows.

The flow restriction element 704 is movable relative to the second channel part 702 by the centrifugal force 710 caused by the rotational speed of the rotor 102. The flow control device 410 comprises an elastic element 706 and a damper 712. The elastic element 706 couples the flow restriction element 704 to the channel 200. The damper 712 couples the flow restriction element 704 to the channel 200. The elastic element 706 is arranged to elongate in response to the centrifugal force 710 caused by the rotational speed of the rotor 102. The damper 712 limits the speed of the flow restriction element 704.

The centrifugal force 710 moves the flow restriction element 704 from the position as shown in FIG. 11A to the position as shown in FIG. 11B. Because the flow restriction element 704 is closer to the wall 1000 in FIG. 11B than in FIG. 11A, a larger flow resistance is created in the restriction area 708. A larger pressure drop occurs in the further fluid 214 in the restriction area 708 in the situation of FIG. 11B than in the situation of FIG. 11A. By increasing the flow resistance in dependency of the centrifugal force 710, the flow of the further fluid 214 is not increased or only increase a small amount by the centrifugal force 710.

FIG. 12 depicts an eight embodiment according to the invention. The eight embodiment is the same as the other embodiments, except for the following.

FIG. 12 depicts the rotation device 100 having the stator 104 and the rotor 102 arranged relative to each other to form an axial gap. The gap 112 is the axial gap. The rotor 102 is provided with the channel 200 to provide the further fluid 214 to the gap 112. The sealing device 108 is adapted to direct the fluid 114 from the liquid inlet 116 to the target component 106. The sealing device 108 is also adapted to direct the further fluid 116 to the target component 106. The sealing device 108 helps prevents or limits the fluid 114 from entering the axial gap. The sealing device 108 is arranged radially outward of the rotor 102.

The invention claimed is:

1. A rotation device comprising a rotor, a stator, a target component, and a sealing device,
    wherein the rotor is arranged to rotate along a rotation axis relative to the stator,
    wherein the stator and the rotor are arranged relative to each other to form a gap between the rotor and the stator,
    wherein the sealing device is attached to the rotor to hydrodynamically seal the gap against a fluid, wherein the fluid is a liquid,
    wherein the sealing device is adapted to direct the fluid to the target component to exchange heat between the target component and the fluid, and/or to lubricate the target component with the fluid, and
    wherein the sealing device is at least partially arranged axial outward of the rotor.

2. The rotation device according to claim 1, wherein the rotation device is adapted to guide a flow from the sealing device to the target component, wherein the sealing device is adapted to direct the fluid and/or a further fluid to the target component.

3. The rotation device according to claim 2, comprising a channel having an inlet and at least one outlet,
    wherein the at least one outlet is arranged radially outward of the inlet,
    wherein the channel is arranged to guide the further fluid from the inlet to the at least one outlet,
    wherein the outlet is arranged relative to the gap to seal the gap with the further fluid against the fluid.

4. The rotation device according to claim 3, wherein the at least one outlet is arranged in the gap.

5. The rotation device according to claim 3, wherein the at least one outlet is arranged in the sealing device.

6. The rotation device according to claim 3, comprising a flow control device arranged in the channel,
    wherein the flow control device is adapted to adjust a flow resistance in the channel for the further fluid in dependency of a rotational speed of the rotor.

7. The rotation device according to claim 6, wherein the flow control device comprises a first channel part, a second channel part and a flow restriction element,
    wherein the first channel part has a first channel cross-section,
    wherein the second channel part is adjacent to the first channel part and has a second channel cross-section,
    wherein the first channel cross-section is larger than the second channel cross-section,
    wherein the flow control device guides the further fluid through the first channel part cross-section and the second channel part,
    wherein the flow restriction element is arranged in the first channel part relative to the second channel part to restrict a flow of the further fluid between the first channel part and the second channel part,
    wherein the flow restriction element is movable relative to the second channel part by a centrifugal force caused by the rotational speed of the rotor.

8. The rotation device according to claim 7, wherein the flow control device comprises an elastic element,
    wherein the elastic element couples the flow restriction element to the channel,
    wherein the elastic element is arranged to elongate and/or shorten in response to the centrifugal force caused by the rotational speed of the rotor.

9. The rotation device according to claim 7, wherein the flow restriction element is moveable in a radial direction of the rotor.

10. The rotation device according to claim 2, wherein the stator comprises a stator channel having a stator inlet and at least one stator outlet,
    wherein the at least one stator outlet is arranged radially inward of the stator inlet,
    wherein the stator channel is arranged to guide the further fluid comprising the stator fluid from the stator inlet to the at least one stator outlet,
    wherein the stator outlet is arranged relative to the gap to seal the gap with the stator fluid against the fluid.

11. The rotation device according to claim 1, wherein the target component is arranged outside the gap.

12. The rotation device according claim 1, wherein the target component is attached to the stator.

13. The rotation device according to claim 1, wherein the target component is configured to generate heat during operation of the rotation device.

14. The rotation device according to claim 2, wherein the further fluid comprises a gap fluid and/or a surrounding fluid and/or a stator fluid.

15. The rotation device according to claim 14, wherein the gap comprises a gap inlet and a gap outlet,
    wherein the gap outlet is arranged axial outward relative to the rotor and the stator,
    wherein the gap is adapted to:
        guide the further fluid comprising the gap fluid from the gap inlet to the gap outlet, and
    wherein the sealing device is adapted to:
        receive the gap fluid, and
        direct the fluid combined with the gap fluid to the target component.

16. The rotation device according to claim 14, wherein the flow is a mixture of the surrounding fluid and the fluid, or the flow is a mixture of the surrounding fluid, the gap fluid and the fluid, wherein the sealing device is adapted to direct the flow to the target component.

17. The rotation device according to claim 14, wherein the flow comprises the surrounding fluid, wherein the sealing device is adapted to direct the fluid to the target component using the flow.

18. The rotation device according to claim 1, comprising a liquid inlet to provide the liquid from a liquid supply to the rotation device.

19. The rotation device according to claim 18, wherein the liquid inlet is arranged to supply the liquid to the target component,
wherein the rotation device is adapted to guide at least part of the liquid via the target component to the sealing device,
wherein the sealing device is adapted to direct the at least part of the liquid back to the target component.

20. The rotation device according to claim 18, comprising a further component,
wherein the liquid inlet is arranged to supply the liquid to the further component,
wherein the rotation device is adapted to guide at least part of the liquid via the further component to the sealing device,
wherein the sealing device is adapted to direct the at least part of the liquid to the target component.

21. The rotation device according to claim 20, wherein the liquid inlet is arranged to direct the fluid to the further component to perform one of exchanging heat between the further component and the fluid, and lubricating the further component with the fluid,
wherein the sealing device is adapted to perform the other of exchanging heat between the target component and the fluid and lubricating the target component with the fluid.

22. The rotation device according to claim 18, wherein the liquid inlet is adapted to provide a jet of liquid to the target component.

23. The rotation device according to claim 1, wherein the liquid comprises at least one of oil and water.

24. The rotation device according to claim 1, wherein the stator is arranged radial outward of the rotor to form the gap as a radial gap between the rotor and the stator.

25. The rotation device according to claim 1, wherein the sealing device is adapted to contactless seal the gap against the fluid.

26. The rotation device according to claim 1, wherein the sealing device has a sealing surface,
wherein the sealing surface extends along the rotation axis from a first radial dimension to a second radial dimension larger than the first radial dimension,
wherein the sealing surface is adapted to direct the fluid away from the gap towards the target component.

27. The rotation device according to claim 26, wherein the second radial dimension is larger than an outer radial dimension of the rotor.

28. The rotation device according to claim 26, wherein the first radial dimension is smaller than an outer radial dimension of the rotor.

29. The rotation device according to claim 26, wherein the sealing surface is curved.

30. The rotation device according to claim 26, wherein the sealing surface has a tangent line at the second radial dimension,
wherein the tangent line is directed at a target surface of the target component,
wherein the target surface and the sealing surface are arranged at an offset along the rotational axis relative to each other.

31. The rotation device according to claim 26, wherein the sealing device comprises multiple blades arranged on the sealing surface, wherein the blades are arranged to displace the fluid by rotation of the rotor.

32. The rotation device according to claim 1, wherein the target component is one of a bearing, an electric coil and a gear.

33. An electric motor or electric generator comprising the rotation device according to claim 1, and a plurality of electric coils,
wherein the stator comprises the plurality of electric coils,
wherein the target component comprises at least one of the plurality of electric coils.

34. A gear box comprising the rotation device according to claim 1 and a gear,
wherein the gear is coupled to the rotor,
wherein the target component comprises the gear.

35. A turbomachine comprising the rotation device according to claim 1.

* * * * *